Q12) United States Patent
Chrysanthakopoulos

(10) Patent No.: US 6,704,819 B1
(45) Date of Patent: Mar. 9, 2004

(54) METHOD AND APPARATUS FOR DEVICE SHARING AND ARBITRATION

(75) Inventor: Georgios Chrysanthakopoulos, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/553,453

(22) Filed: Apr. 19, 2000

(51) Int. Cl.[7] ................................................ G06F 1/00
(52) U.S. Cl. ........................ 710/240; 710/200; 710/309
(58) Field of Search ................................. 710/306, 309, 710/311, 313, 316, 240, 243, 244, 315, 15, 16, 110, 113, 200; 709/208, 209, 211, 219, 227, 250

(56) References Cited

U.S. PATENT DOCUMENTS

| 5,317,693 | A | * | 5/1994 | Cuenod et al. ............. 710/305 |
| 5,805,905 | A | * | 9/1998 | Biswas et al. .............. 710/260 |
| 5,938,752 | A | * | 8/1999 | Leung et al. ............... 710/126 |
| 6,018,785 | A | * | 1/2000 | Wenniger .................... 710/200 |
| 6,038,625 | A | * | 3/2000 | Ogino et al. ................ 710/104 |
| 6,105,094 | A | * | 8/2000 | Linderman .................. 710/107 |
| 6,115,770 | A | * | 9/2000 | Gehman ...................... 710/128 |
| 6,141,702 | A | * | 10/2000 | Ludtke et al. ................. 710/5 |
| 6,182,112 | B1 | * | 1/2001 | Malek et al. ................ 709/201 |
| 6,366,964 | B1 | * | 4/2002 | Shima et al. .................. 710/8 |
| 6,378,000 | B1 | * | 4/2002 | Akatsu et al. .............. 709/245 |
| 6,385,679 | B1 | * | 5/2002 | Duckwall et al. ........... 710/119 |
| 6,389,502 | B1 | * | 5/2002 | Toguchi ...................... 710/314 |
| 6,389,560 | B1 | * | 5/2002 | Chew .......................... 714/43 |
| 6,434,117 | B1 | * | 8/2002 | Momona ..................... 370/236 |
| 6,519,657 | B1 | * | 2/2003 | Stone et al. ................ 710/306 |
| 6,519,671 | B1 | * | 2/2003 | Kondou et al. ............. 710/311 |
| 6,529,984 | B1 | * | 3/2003 | Tenner et al. ............... 710/240 |

FOREIGN PATENT DOCUMENTS

| EP | 0827062 A1 | * | 4/1998 |
| EP | 0930747 A1 | * | 7/1999 |
| EP | 1217787 A2 | * | 6/2002 |

* cited by examiner

*Primary Examiner*—Paul R. Myers
*Assistant Examiner*—Raymond N Phan
(74) *Attorney, Agent, or Firm*—Banner & Witcoff, Ltd.

(57) ABSTRACT

In a system in which control-capable nodes are coupled to each other and one or more devices via a communications bus, the control-capable nodes determine the identity of an owner node of a given device and register with the owner node for notification of changes to the device's ownership. The control-capable nodes may request ownership from the owner node, which request may be granted or denied, or the control-capable nodes may detect that ownership by the owner node has terminated. It such a request is granted, or if such termination is detected, the control-capable nodes attempt to establish ownership of the device according to previously assigned priorities. Data structures supporting these operations provide communications between device drivers and bus drivers in a control-capable node, and provide communications between bus drivers in different control-capable nodes. In this manner, the present invention provides a technique for device arbitration that does not require modifications to, nor participation by, the controlled devices.

33 Claims, 3 Drawing Sheets

METHOD AND APPARATUS FOR DEVICE SHARING AND ARBITRATION

TECHNICAL FIELD

The present invention relates generally to the use of serial buses as a means of communication between electronic devices and, in particular, to the sharing and ownership arbitration of a device between control-capable nodes via a serial bus, such as a serial bus operating in conformance with the IEEE 1394 Serial Bus standard.

BACKGROUND OF THE INVENTION

It is known in the art to provide computer systems in which a plurality of computers are provided access to a variety of devices via a communication bus. For example, a serial bus may be used to share a printer between computers coupled to the printer via the serial bus. It is the nature of some devices that various computers can simultaneously share them, e.g., any device that only transmits information, such as a television or radio receiver. Other devices, such as computer hard drives, cannot be shared and are owned by (subject to the direction and control of) a single computer at any given moment. A serial bus technology capable of implementing the scenario described above is the so-called IEEE 1394 serial bus, sometimes referred to as "FIREWIRE".

While the scenario described above offers significant benefits by allowing devices to be shared amongst users, it also presents significant control problems. In particular, schemes must be devised to determine which computers own a device at any given moment, how to notify other computers that the ownership status of a device has changed, how to allow computers to request transfers of ownership of a device, etc. In short, techniques to arbitrate sharing of the devices must be provided.

One technique for providing such arbitration is the so-called Home Audio/Video Interoperability (HAVI) Architecture described in "The HAVI Specification: Specification of the Home Audio/Video Interoperability (HAVi) Architecture", version 1.0 beta dated Nov. 19, 1998, hereinafter the HAVI specification. The HAVI specification describes a system in which a home network (i.e., a communications infrastructure used within a home or residence) is viewed as a distributed computing platform, with the primary goal of the HAVI architecture to assure that various devices coupled to the home network can interoperate. The HAVI system incorporates and is built upon the IEEE 1394 serial bus. A necessary component of such a system is resource management wherein controllers are allowed to use controlled devices in an organized fashion, i.e., arbitration of device ownership. To support this, HAVI requires that the controlled devices themselves be modified in order to fit into the HAVI system such that the controlled devices themselves participate in the ownership arbitration process.

While the HAVI approach appears to be viable, it would be advantageous to provide an arbitration technique that does not require the devices being controlled to be modified and that does not require the participation of the controlled devices in the arbitration process. Such a technique should preferably be implementable using the IEEE 1394 serial bus.

SUMMARY OF THE INVENTION

The present invention provides techniques whereby devices coupled to a plurality of control-capable nodes via a communication bus may be shared in an organized fashion. In particular, the present invention is directed to the use of a 1394-compliant serial bus as a means of coupling 1394-compliant devices and control-capable nodes together. Control-capable nodes can determine the identity of an owner node of a given device and register with the owner node for notification of changes to ownership status of the device. Subsequently, the control-capable nodes may request ownership from the owner node, which request may be granted or denied, or the control-capable nodes may detect that ownership by the owner node has terminated. If such a request is granted, or if such termination is detected, the control-capable nodes can attempt to establish ownership of the device according to previously assigned priorities. Preferred data structures supporting these operations are disclosed, the data structures providing communications between device drivers and bus drivers in a control-capable node, and providing communications between bus drivers in different control-capable nodes. Furthermore, the data structures may be used to provide transparent communication between device drivers on different control-capable nodes. In this manner, the present invention provides a technique for device arbitration that does not require modifications to, nor participation by, the controlled devices.

DETAILED DESCRIPTION OF THE INVENTION

Figure 1:
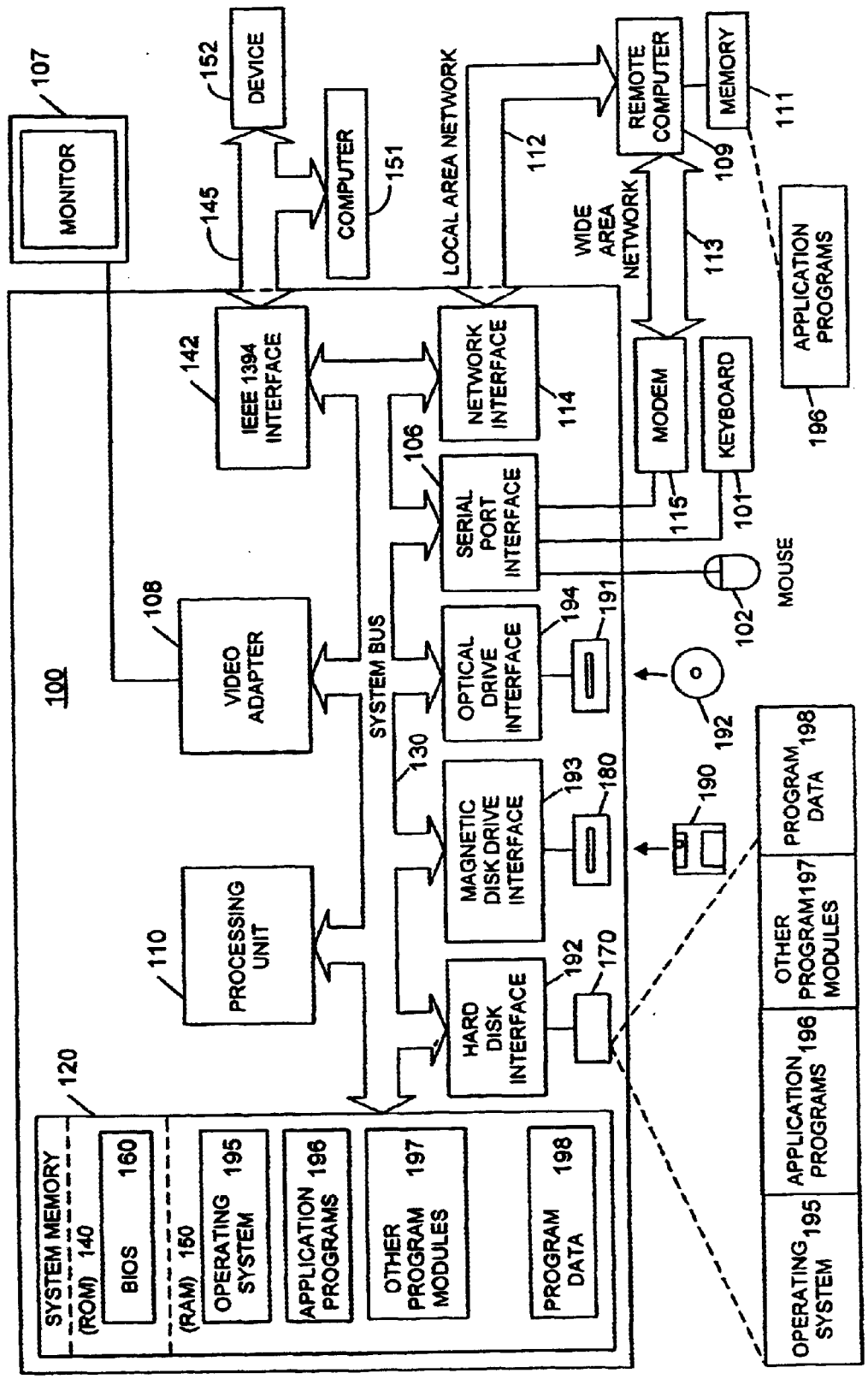
FIG. 1 is a schematic block diagram of a conventional general-purpose digital computing environment that may be used to implement various aspects of the present invention.

The present invention may be more fully described with reference to FIGS. 1–4. FIG. 1 is a schematic diagram of a conventional general-purpose digital-computing environment that can be used to implement various aspects of the present invention. A computer 100 includes a processing unit 110, a system memory 120 and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for the computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. In particular, the RAM 150 will, from time to time, store various device drivers (including, for example, a complete IEEE 1394 driver stack) as part of the operating system 195, as known in the art. Furthermore, data structures disclosed herein are stored and manipulated with the RAM 150, although the other storage devices disclosed herein may be equally employed.

A user can enter commands and information into computer 100 through input or selection devices, such as a keyboard 101 and a pointing device 102. The pointing device 102 may comprise a mouse, touch pad, touch screen, voice control and activation or other similar devices. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers.

An additional serial port in the form of an IEEE 1394 interface 142 may also be provided. The IEEE 1394 interface 142 couples an IEEE 1394-compliant serial bus 145 to the system bus 130 or similar communication bus. The IEEE 1394-compliant serial bus 145, as known in the art, allows devices 152 and other computers 151 to communicate with the computer 100 and each other using high-speed serial channels. The IEEE 1394 serial bus standard is based largely upon the internationally adopted ISO/IEC 13213 (ANSI/IEEE 1212) CSR Architecture Specification and the IEEE 1394-1995 Serial Bus Specification, the teachings of which are herein incorporated by these references. A typical serial bus having an IEEE 1394 standard architecture is comprised of a multiplicity of nodes that are interconnected via point-to-point links, such as cables, that each connect a single node of the serial bus to another node of the serial bus. The nodes themselves are addressable entities that can be independently reset and identified. Each node provides a so-called configuration ROM (read-only memory) or configuration memory and a standardized set of control registers that can be accessed by software residing within the computer system. The configuration memory of a given node provides, in part, a description of the functional capabilities of that node. The configuration memory for each node residing on the serial bus is exposed to all other nodes. During a configuration process, other nodes access each node's configuration memory (a process often referred to as "enumerating") in order to determine the proper system configuration. Thus, one function of the configuration memory of a given node is to instruct other nodes as to the given node's functional capabilities, thereby allowing the other nodes to determine which device drivers to load. As known in the art, each device has an associated driver that, among other functions, configures the device and allows the device to be operable within the overall system. Drivers are typically software instructions that can be loaded into a computer's memory that, when executed, will communicate with the corresponding device to properly configure the device for operation. The driver may initialize the device so that the device can function and the driver may also allow the device to communicate with higher protocol levels within the computer.

The computer 100 can operate in a networked environment using logical connections to one or more remote computers, such as a remote computer 109. The remote computer 109 typically includes at least some of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to local network 112 through a network interface or adapter 114. When used in a WAN networking environment, the computer 100 and remote computer 109 may both include a modem 115 or other means for establishing a communications over wide area network 113, such as the Internet. The modem 115, which may be internal or external, is connected to system bus 130 via the serial port interface 106. In a networked environment, program modules depicted relative to the computer 100, or portions thereof, may be stored in the remote memory storage device.

It will be appreciated that the network connections shown are exemplary and other means of establishing a communications link between the computers can be used. The existence of any of various well-known protocols, such as TCP/IP, "ETHERNET", FTP, HTTP and the like, is presumed, and the system can be operated in a client-server configuration to permit a user to retrieve web pages from a web-based server.

Figure 2:
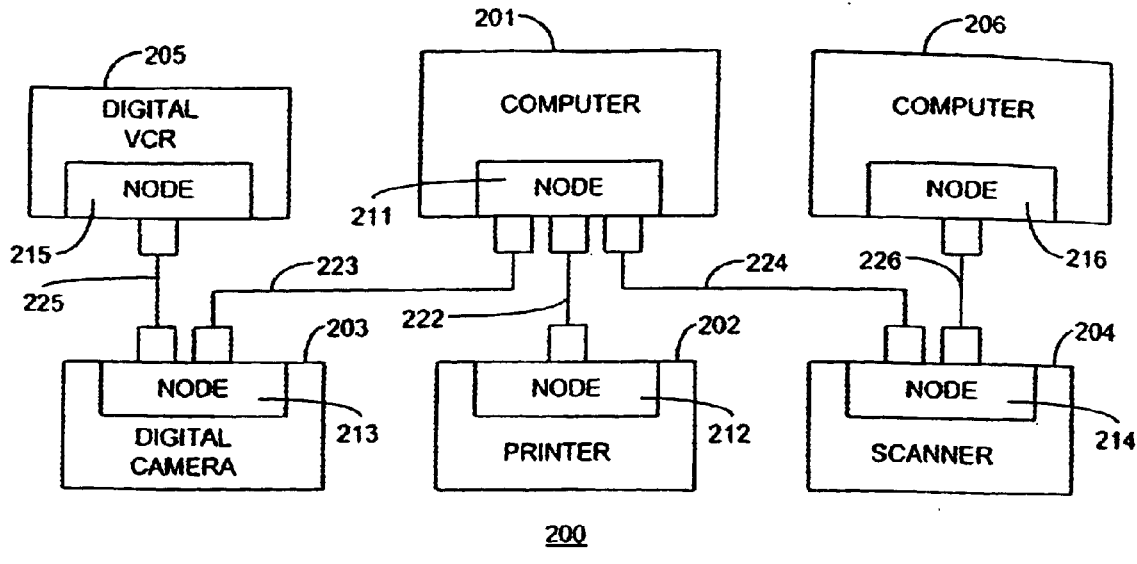
FIG. 2 is a schematic block diagram of a system of devices and corresponding nodes coupled together via a serial bus.

Procedures of the present invention to be described below can operate within the environment of the computer 100 shown in FIG. 1. Although the present invention is generally applicable to a computer operating in accordance with the IEEE 1394 standard, the present invention is applicable to any computer system that implements the Control and Status Registers (CSR) configuration ROM architecture described in the ISO/IEC 13213 (ANSI/IEEE 1212) CSR Architecture Specification. Even more generally, the present invention is applicable to any communication bus providing peer-to-peer communications. An exemplary system of devices 200 communicating via a serial bus, to which system the present invention may be beneficially applied, is illustrated in FIG. 2.

The system 200 comprises several entities coupled via a serial bus, the entities including a first computer 201 (such as the computer 100 of FIG. 1), a printer 202, a digital camera 203, a scanner 204, a digital VCR 205 and a second computer 206 (also like the computer 100 of FIG. 1). As shown, the entities 201–206 are coupled to each other via multiple interconnections 222–226. Each of the interconnections 222–226 is preferably constructed in accordance with the IEEE 1394 standard and includes a first differential signal pair for conducting a first signal, a second differential signal pair for conducting a second signal, and a pair of power lines. Although specific entities interconnected in a specific manner are shown in FIG. 2, those having ordinary skill in the art will recognize that a wide variety of electrical/electronic devices could be coupled together in this manner using a similarly wide variety of interconnections. Collectively, the interconnections 222–226 constitute the cabling of the serial bus and a plurality of nodes 211–216 implements the functionality of the serial bus. Each of the entities of the computer system 200 is coupled to a node of the serial bus. In general, the entity to which a node is coupled acts as the "local host" for that node. For example, the first computer 201 is the local host for the first computer node 211; the printer 202 is the local host for the printer node 212; the digital camera 203 is the local host for the digital camera node 213; the scanner 204 is the local host for the scanner node 214; the digital VCR 205 is the local host for the digital VCR node 215; and the second computer 206 is the local host for the second computer node 216. It is not necessary for every node to have a local host, nor is it necessary that the local host always be powered.

Each of the nodes 222–226 may have identical construction, although some of the nodes can be simplified because of their specific functions. Thus, the nodes can be modified to meet the needs of the particular local host. For example, each node has one or more ports, the number of which is dependent upon its needs; as illustrated, the first computer node 211 has three ports while the digital VCR node 215 has only one port.

Two types of entities may be coupled to a communication bus in the context of the present invention: control-capable nodes and devices. Control-capable nodes are entities, and their corresponding nodes, which are capable of ownership of other entities. Devices, in contrast, are not capable of such ownership and are themselves subject to ownership by control-capable nodes. Control-capable nodes are particularly distinguished in that they communicate with each other, and not the devices, when arbitrating ownership of the devices. For example, each of the first and second computers 201, 206 and their corresponding nodes 211, 216 shown in FIG. 2 would typically constitute control-capable nodes, whereas the printer 202, digital camera 203, scanner 204 and digital VCR 205 would constitute devices. However, those having ordinary skill in the art will recognize that virtually any of the entities shown in FIG. 2, and their equivalents, may be provided with sufficient functionality, as described hereinbelow, to operate as control-capable nodes. Because the control-capable nodes implement the arbitration scheme of the present invention, the devices are allowed to remain ignorant of ownership and arbitration processing.

Figure 3:
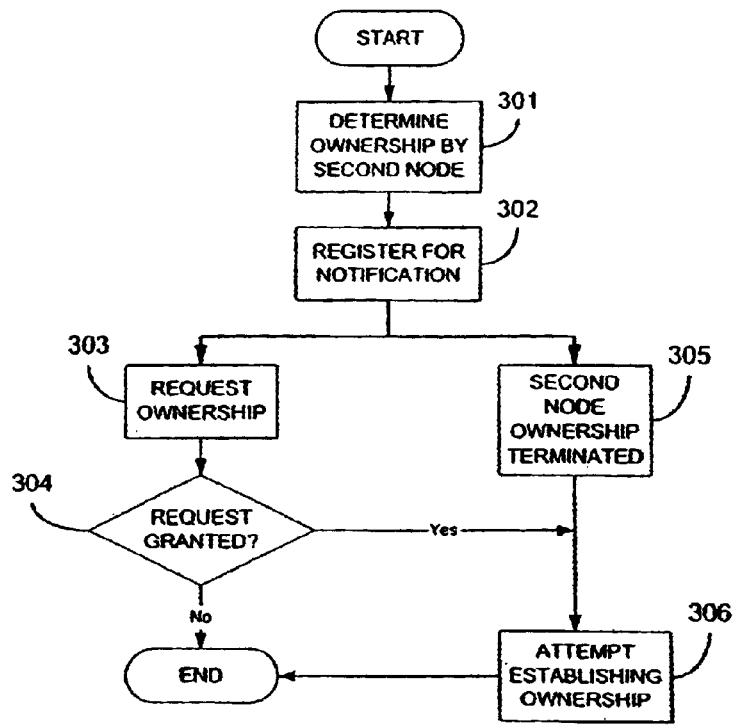
FIG. 3 is a flowchart illustrating a method in accordance with the present invention.

Referring now to FIG. 3, there is illustrated a method in accordance with the present invention. Control-capable nodes, communicating via a communication bus, execute the method illustrated in FIG. 3, which generally describes the device arbitration approach of the present invention. A specific implementation of this general process is provided below relative to FIG. 4. At step 301, a first control-capable node determines that a second control-capable node is currently an owner of a given device. Such ownership may be exclusive or non-exclusive. Where non-exclusive, the first control-capable node may be able to share access to the device with one or more current owners. Where ownership can be shared, a primary owner is designated and other owners (or potential owners, as described below) are assigned priorities such that succession of ownership is established. For the sake of simplicity of explanation, it is assumed that the second control-capable node is the sole owner.

Regardless, upon determining that the second control-capable node has ownership over the device, the first control-capable node registers for notification, at step 302, with the owner node, i.e., the second control-capable node. By registering for notification with the owner node, the first control capable node will be notified by the owner node of any changes to ownership status of the device. Thus, the transfer of ownership to another node will cause the first control-capable node to receive a notification of the change in ownership. Alternatively, any change in assigned priority for the first control-capable node will result in a notification to that effect.

Following the step of registering for notifications, at least two possible paths may be followed, as shown in FIG. 3. Along the first path, the first control-capable node may request ownership from the owner node at step 303. For example, if the device in question is, say, a peripheral hard drive currently in use by the owner node, the first control-capable node may send a request directly to the owner node requesting a transfer of ownership of the hard drive to itself. If the ownership request is granted, at step 304, by the owner node, the first control-capable node subsequently attempts to establish ownership at step 306. In one embodiment of the present invention, a given node is allowed to transfer ownership from the current owner node only if it has the highest assigned priority; if not, nodes having a higher priority are allowed to attempt ownership first.

Along the second path, the first control-capable node may determine, at step 305, that the ownership of the owner node has been terminated. Such termination may result from the physical removal of the owner node from the communication bus. Alternatively, the owner node may abdicate ownership outright, i.e., notify the other control-capable nodes on the bus that it is no longer the owner. Regardless of how the termination of ownership is effectuated, the first control-capable node again attempts to establish ownership of the device at step 306 subject, as above, to the previously-made priority assignments.

Figure 4:
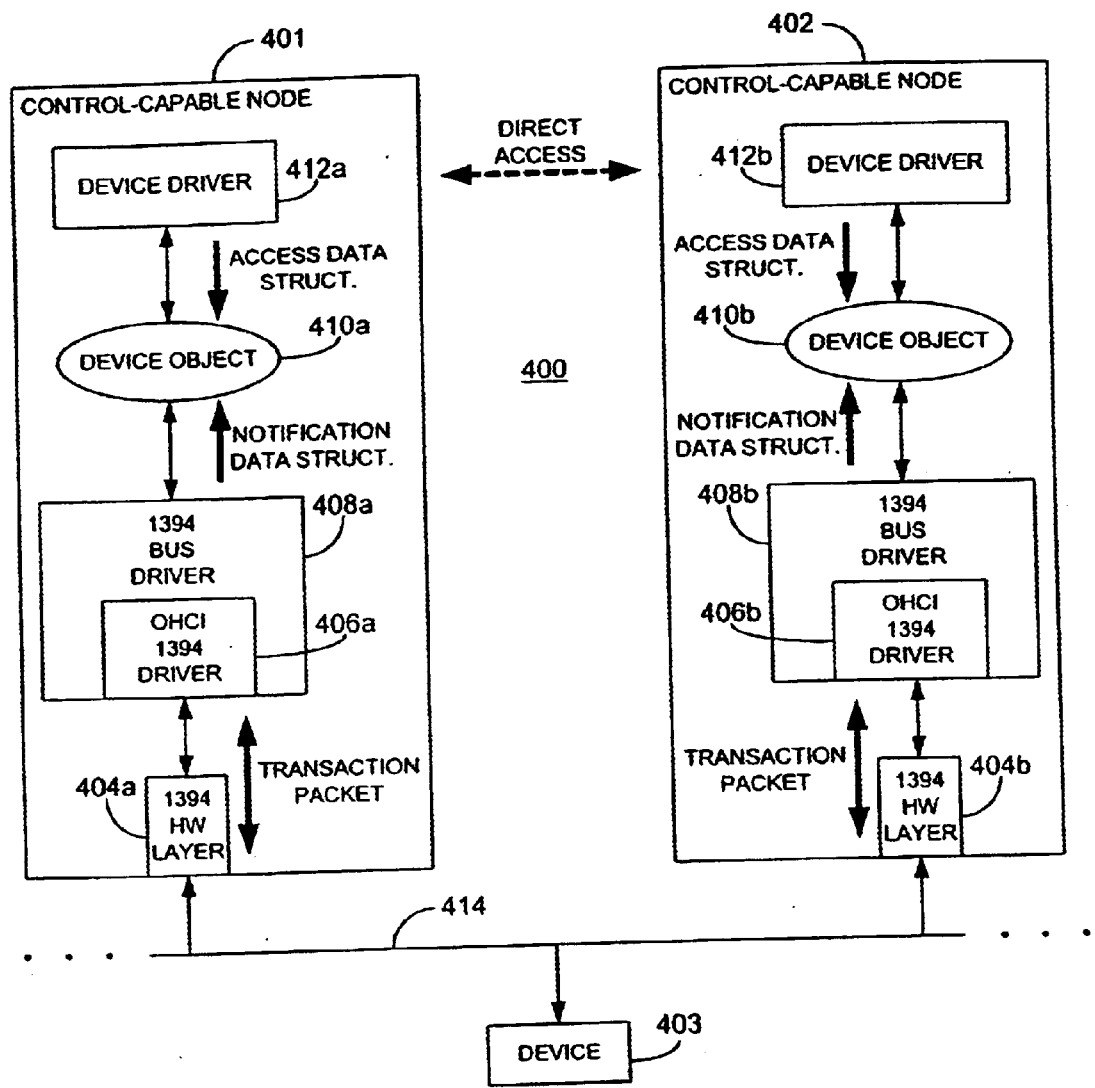
FIG. 4 is a block diagram illustrating in greater detail control-capable nodes coupled to a device via a communications bus in accordance with the present invention.

A particular implementation of the method described above is further discussed with regard to FIG. 4. In particular, FIG. 4 illustrates a computer system 400 comprising at least two control capable nodes 401–402 coupled to a device 403 via a communication bus 414. Preferably, the communication bus 414 comprises an IEEE 1394-compliant serial bus. However, it is understood that any communication bus capable of supporting peer-to-peer communications may be used when implementing the present invention.

Each of the control-capable nodes 401–402 comprises a similar protocol stack structure as shown. In particular, each control-capable node 401–402 comprises, at the bottom of the protocol stack, an IEEE 1394-compliant hardware layer 404. Particular implementations of the hardware layer 404 are well known in the art and are typically dependent upon the particular device being implemented, i.e., a computer, a digital camera, a printer, etc.

Bus drivers 408 manage communications between the physical bus 414 via the hardware layer 404 and higher-level protocol layers. In a preferred embodiment, the 1394-compliant bus driver 408 comprises an Open Host Controller Interface (OHCI) driver 406 implementation of the IEEE 1394 link layer protocol. The OHCI is described in the Open Host Controller Interface Specification, which specification is incorporated herein by this reference.

Device objects 410 are also preferably provided in the form of data structures. The use of device objects 410 representing physical devices 403 is well known in the art.

In particular, device objects 410 are created by the bus drivers 408 after the device 403 is enumerated (i.e., the configuration memory of the device 403 is accessed to ascertain the functionality of the device 403) by the bus drivers 408. Based on the device objects 410, a so-called plug and play (PnP) subsystem loads high level device drivers 412 that facilitate communication between a user of the corresponding node 402–402 and the device 403. Thus, device objects are used by the PnP subsystem to track enumerated devices within a single operating system. At the top of the protocol stack, the device drivers 412 are typically software instructions that communicate with, and control, separate devices for operation on behalf of the control-capable nodes upon which they are loaded. Furthermore, the device drivers 412 bridge the protocol gap between the IEEE 1394 protocol and whatever protocol is adhered to by its corresponding device. Higher level applications that communicate with the device drivers 412 are not shown. However, such higher level applications are well known in the art and often function, for example, as means for providing an interface between a user of the control-capable nodes 401–402 and device 403 being controlled.

Also shown in FIG. 4 are various data structures (heavy arrows) in accordance with the present invention that are passed between the various elements shown in FIG. 4. These data structures at least enable implementation of the method described above relative to FIG. 3. As shown, an access data structure is passed from the device drivers 412 to the bus drivers 408 via the device objects 410. Conversely, notification data structures are passed from the bus drivers 408 to the device drivers 412 via the device objects 410. Additionally, transaction packets are provided for communication between bus drivers 408 residing on different control-capable nodes. Thus, when used in accordance with the present invention, the access and notification data structures and the transaction packets enable a peer-to-peer communication path that allows the device drivers 412 to participate in device arbitration. Furthermore, as described below, these data structures also facilitate direct access communication between device drivers, as illustrated by the heavy dashed line in FIG. 4. The following description illustrates a particular implementation of the data structures illustrated in FIG. 4 and their corresponding use in a variety of situations. However, it is understood that the present invention is not limited in this regard and is susceptible to other implementations.

A particular implementation of an access data structure in accordance with the present invention is illustrated below in Table 1. As shown, the access data structure is implemented in accordance with the so-called Windows Management Instrumentation (WMI) scheme. The WMI scheme provides a standardized interface/data passing technique for use in "WINDOWS" brand operating systems.

TABLE 1

```
typedef struct _DEVICE1394_WMI_ACCESS_DATA
{
  // API Version.
  ULONG Version;
  #define DEVICE1394_WMI_ACCESS_VERSION_SIZE
  sizeof(ULONG)
  #define DEVICE1394_WMI_ACCESS_VERSION_ID 1
  // Set for Desired Access
  #define DEVICE1394_DESIRED_ACCESS 0x1
  // Ownership Local Node
  #define DEVICE1394_OWNERSHIP_LOCAL 0x2
```

TABLE 1-continued

```
  // Ownership Remote Node
  #define DEVICE1394_OWNERSHIP_REMOTE 0x4
  // Access shared for read
  #define DEVICE1394_ACCESS_SHARED_READ 0x8
  // Access shared for write
  #define DEVICE1394_ACCESS_SHARED_WRITE 0x10
  // Access exclusive
  #define DEVICE1394_ACCESS_EXCLUSIVE 0x20
    // Ownership and Access Flags
    ULONG OwnershipAccessFlags;
    #define DEVICE1394_WMI_ACCESS_FLAGS_SIZE
    sizeof(ULONG)
    #define DEVICE1394_WMI_ACCESS_FLAGS_ID 2
  // Notify on bus events
  #define DEVICE1394_NOTIFY_ON_BUS_EVENT 0x1
  // Notify on access change
  #define DEVICE1394_NOTIFY_ON_ACCESS_CHANGE 0x2
    // Notification Flags
    ULONG NotificationFlags;
    #define DEVICE1394_WMI_ACCESS_NOTIFICATION_
    FLAGS_SIZE sizeof(ULONG)
    #define DEVICE1394_WMI_ACCESS_NOTIFICATION_
    FLAGS_ID 3
  // EUI-64 of remote device
  ULONGLONG RemoteOwnerEui;
  #define DEVICE1394_WMI_ACCESS_REMOTE_OWNER_
  EUI64_SIZE sizeof(ULONGLONG)
  #define DEVICE1394_WMI_ACCESS_REMOTE_OWNER_
  EUI64_ID 4
  // Reserved for future use
  BOOLEAN Reserved1;
  #define DEVICE1394_WMI_ACCESS_DATA_Reserved1_
  SIZE sizeof(BOOLEAN)
  #define DEVICE1394_WMI_ACCESS_DATA_Reserved1_ID 5
  // Direct Access Offset
  ADDRESS_OFFSET DirectAccessAddress;
} DEVICE1394_WMI_ACCESS_DATA, *PDEVICE1394_WMI_
ACCESS_DATA;
```

The Version field indicates the version of the device application programming interface, i.e., the version of the arbitration scheme. Flag fields are defined indicating desired or current ownership status. In particular, the DEVICE1394_DESIRED field specifies desired (future) access permission. It must be in combination of one of the flags below. The DEVICE1394_OWNERSHIP_LOCAL_NODE field indicates that the local node is the primary owner of the device and other nodes must communicate with it for ownership and access permission changes. The DEVICE1394_OWNERSHIP_REMOTE_NODE field indicates that a remote node is the primary owner of the device and other nodes must communicate with it for ownership and access permission changes. The DEVICE1394_ACCESS_SHARED_READ/WRITE field indicates device global access is currently shared. If OWNERSHIP_LOCAL_NODE is set, the primary/original owner is the local node. The DEVICE1394_ACCESS_EXCLUSIVE field specifies that the device is currently exclusively owned. If xx_LOCAL_NODE is set, the local node has exclusive access. Otherwise, the local node has no ownership or access to the device.

Flag fields are defined indicating current or desired notifications based on sharing and ownership changes on the device. In particular, the DEVICE1394_NOTIFY_ON_BUS_EVENT flag indicates that the bus driver will notify the device driver when a bus event occurs, e.g., a bus reset. The DEVICE1394_NOTIFY_ON_ACCESS_CHANGE flag indicates that the bus driver will notify the device driver when the current device owner changes, goes away or abdicates ownership, or if resource ownership changes or if sharing permissions change. Internal notification of these events to other drivers is done through PnP asynchronous notifications. The REMOTE_OWNER_EUI specifies a unique identification of the owner if the xx_REMOTE_NODE flag is set. The DirectAccessAddress specifies an address offset to a FIFO (first-in, first-out) buffer on a remote owner and is used by protocol drivers for direct communication.

A particular implementation of a notification data structure in accordance with the present invention is illustrated below in Table 2. As shown, the notification data structure is also implemented in accordance with the WMI scheme.

TABLE 2

```
typedef struct _DEVICE1394_WMI_ACCESS_NOTIFICATION
{
  // API Version.
  ULONG Version;
  #define DEVICE1394_WMI_ACCESS_NOTIFY_VERSION_SIZE
  sizeof(ULONG)
  #define DEVICE1394_WMI_ACCESS_NOTIFY_VERSION_ID 1
  // Bus Generation.
  ULONG BusGeneration;
  #define DEVICE1394_WMI_ACCESS_NOTIFY_GENERATION_
  SIZE sizeof(ULONG)
  #define DEVICE1394_WMI_ACCESS_NOTIFY_GENERATION_
  ID 2
  // Notification Type.
  ULONG Type;
  #define DEVICE1394_WMI_ACCESS_NOTIFY_TYPE_SIZE
  sizeof(ULONG)
  #define DEVICE1394_WMI_ACCESS_NOTIFY_TYPE_ID 3
  // Current Ownership Flags
  ULONGLONG OwnerShipAccessFlags;
  #define DEVICE1394_WMI_ACCESS_NOTIFY_FLAGS_SIZE
  sizeof(ULONGLONG)
  #define DEVICE1394_WMI_ACCESS_NOTIFY_FLAGS_ID 4
  // EUI-64 of remote device
  ULONGLONG RemoteOwnerEui;
  #define DEVICE1394_WMI_ACCESS REMOTE_OWNER EUI64_
  SIZE sizeof(ULONGLONG)
  #define DEVICE1394_WMI_ACCESS REMOTE_OWNER EUI64_
  ID 5
  // Reserved for future use
  BOOLEAN Reserved1;
  #define DEVICE1394_WMI_ACCESS_NOTIFICATION_
  Reserved1_SIZE sizeof(BOOLEAN)
  #define DEVICE1394_WMI_ACCESS_NOTIFICATION_
  Reserved1_ID 6
} DEVICE1394_WMI_ACCESS_NOTIFICATION,
*PDEVICE1394_WMI_ACCESS_NOTIFICATION;
```

As with the access data structure, the Version field indicates the version of the notification structure. The BusGeneration field indicates the bus generation at the time the notification was sent. For bus reset notifications, this field reflects the new generation number after the reset. The Type field indicates the type of notification, e.g., whether the notification being sent is the result of a local event or a remote event. It is understood that other types of notifications are possible. The OwnershipAccessFlags defined in the notification data structure have the same definitions as those defined in the access data structure above.

A particular implementation of the transaction packet is illustrated below in Table 3. The transaction packets are used to: (i) identify device owners among multiple control-capable nodes, (ii) register notifications with a remote owner node, (iii) broadcast ownership changes when an owner abdicates ownership, and (iv) send unsolicited messages from one device driver on a first control-capable node to another device driver on a second control-capable node.

TABLE 3

```
typedef struct _BUS1394_WINDOWSPC_TRANSACTION_
PACKET {
  ULONG           PacketType;
  ULONG           Flags;
  ULONG           Version;
  ULARGE_INTEGER  SourceEUI;
  ULARGE_INTEGER  TargetEUI;
  union {
    struct {
      ULONG       DesiredAccess;
      ULONG       Notification;
    } RegisterNotificationRequest;
    struct {
      NTSTATUS    Status;
      ULONG       AssignedPriority;
    } RegisterNotificationResponse;
    struct {
      ULONG       AssignedPriority;
      ULONG       DesiredAccess;
      ULONG       Notification;
    } AccessTransferRequest;
    struct {
      NTSTATUS    Status;
      ULONG       GrantedAccess;
    } AccessTransferResponse;
    struct {
      ULONG CurrentAccess;
    } AccessNotificationMessage;
    struct {
      ULONG Length;
      ULONG ProtocolData;
    } ProtocolMessage;
  } u;
} BUS1394_WINDOWSPC_TRANSACTION_PACKET,
*PBUS1394_WINDOWSPC_TRANSACTION_PACKET;
```

Once again, the Version field indicates the version of the transaction packet. The PacketType field indicates the type of packet being sent. Packet types are defined for registration requests, registration responses, access transfer requests, access transfer responses, access notifications and direct communications. These are the packets that control-capable nodes exchange with each other to implement the control scheme of the instant invention. Each of these packet types are discussed below. Those having ordinary skill in the art will recognize that other packet types are possible. The Flags defined in the transaction packet have the same definitions as the OwnershipAccessFlags defined in the access and notification data structures above. The SourceEUI field specifies a unique identification of the control-capable node sourcing the transaction packet. Conversely, the TargetEUI field specifies a unique identification of a targeted control-capable node. The TargetEUI field can be set to NULL for protocol specific packets that are not tied to a particular device.

Within the transaction packet, structures are defined corresponding to each of the packet types. For registration requests, a RegisterNotificationRequest structure is defined comprising a DesiredAccess field and a Notification field. The DesiredAccess field comprises the same flags as the OwnershipAccessFlags defined for the purpose of indicating the type of access to a given device desired by the requesting entity. The Notification field serves a similar purpose to the Type field described above relative to the notification structure (Table 2). Complimenting registration requests, registration responses are defined by the RegisterNotificationResponse structure comprising a Status field and an AssignedPriority field. The Status field reflects the status of operation of the responding entity and is preferably of type NTSTATUS and can take any of the existing status values used in the "WINDOWS" brand operating system. The AssignedPriority field indicates how many other control-capable nodes are in line for notification on ownership changes. If a device driver for a given control-capable node is assigned a priority of 1, then that control-capable node has the highest priority in gaining ownership of the device if the current ownership is terminated.

Access transfer requests are defined by the AccessTransferRequest structure comprising the AssignedPriority, DesiredAccess and Notification fields described above. As its name would imply, the access transfer request is used by an entity when it desires to gain access to a device from a current owner of that device. In this context, the AssignedPriority, DesiredAccess and Notification fields serve the same purpose as defined above. The AccessTransferResponse structure comprising the Status field, described above, and a GrantedAccess field define access transfer responses. The GrantedAccess field comprises the same flags as the OwnershipAccessFlags and defines the type of access granted by the owner to the requesting entity.

Access notifications, used by a given node to inform other nodes of its current access to a given device, are defined by the AccessNotificationMessage structure and comprise a CurrentAccess field. The CurrentAccess field comprises the same flags as the OwnershipAccessFlags and is used to specify the current access status of the sending node relative to a device.

Finally, direct communications between nodes are enabled through the use of ProtocolMessage structures comprising a Length field and a ProtocolData field. The ProtocolData field is the payload of a direct communication (indicated by the heavy dashed line in FIG. 4) between the upper level drivers of two nodes and may comprise any data that is parsed and understood by the upper level drivers. Upon seeing a ProtocolMessage packet, the lower layers know to pass the ProtocolData directly up to the upper level drivers without modification. The Length field informs the lower layers as to the expected length of the ProtocolData.

It should be noted that the transactions packets are preferably exchanged between the control capable nodes using memory mapped addresses (common across all control-capable nodes). Thus, each control-capable node will expose, through its configuration memory, at least one location for receiving request packets from other nodes and at least one location for receiving response packets (to its own requests) from other nodes.

Using the data structures and transaction packets described above, various scenarios implicating ownership arbitration may be considered. Referring again to FIG. 4, the scenarios below assume that the first control-capable node 401 (PC1) is connected to the device 403 (Device A) on the bus and is the current owner of Device A. The scenarios treat various situations involving the second-control capable node 402 (PC2). The scenarios listed below assume that all control-capable nodes on the bus use the protocol stack and protocol drivers described above. Where relevant, examples of interoperating with legacy systems (i.e., systems that do not support the techniques of the present invention) are listed under each scenario.

A. PC2 Added; PC1 Currently Owns Device A

When PC2 is coupled to the bus, a bus reset occurs in accordance with known techniques. The bus reset causes PC1 and Device A to enumerate PC2, and causes PC2 to enumerate PC1 and Device A. Enumeration of Device A by PC2 causes a device object and device driver to be created in PC2. Using protocol-specific means (i.e., a protocol specific to Device A), the device driver on PC2 attempts to acquire ownership of Device A. Through this process, PC2 determines whether PC1 is an exclusive or non-exclusive owner of Device A. If device usage does not mandate exclusive ownership, the device driver on PC2 starts successfully and sends an access data structure with NOTIFY_ON_ACCESS_CHANGE asserted in the notification flags and ACCESS_SHARED_READ/WRITE|DEVICE_OWNERSHIP_REMOTE_NODE asserted in the ownership/access flags. If device usage requires exclusive access, the device driver indicates to upper level layers that the protocol stack has started successfully, but it internally flags the corresponding device object as STOPPED and returns STATUS_ACCESS_DENIED to all input/output request sent by the operating system. The device driver then sends an access data structure to the bus driver with NOTIFY_ON_ACCESS_CHANGE asserted in the notification flags and ACCESS_EXCLUSIVE|DEVICE_OWNERSHIP_REMOTE_NODE asserted in the ownership/access flags. Regardless, the device driver on PC2 subsequently registers with PC1 for notification using an appropriately configured transaction packet.

If, however, the protocol-specific means does not allow the device driver on PC2 to ascertain that PC1 is the owner of Device A, the bus driver on PC2 broadcasts a registration request transaction packet to all control capable nodes on the bus. After receiving the registration request, PC1 responds with a registration response transaction packet, which in turn causes the bus driver on PC2 to issue a notification data structure informing the device driver that PC1 is the remote owner. Additionally, the bus driver on PC2 broadcasts an access notification transaction packet to all control-capable nodes, thereby informing them of the current status of Device A's ownership.

If PC1 is a legacy system, an attempt to register for a notification on PC1 will fail. The bus driver on PC2 will, however, hide this from the device driver by virtue of the notification data structure it sends to the device driver.

B. PC1, PC2 and Device A in Operation; PC1 Physically Removed

When PC1 is physically de-coupled from the bus, a bus reset will occur causing PC2 to renumerate and detect the absence of PC1. In response, the bus driver on PC2 will check with its local device objects to determine if PC1 was an owner of any devices represented by the device objects and for which registrations of notifications were pending. For any device objects registered for notifications (i.e., where the NOTIFY_ON_ACCESS_CHANGE flag is asserted), the bus driver on PC2 sends a notification data structure to the device driver with the appropriate flags set and a WMI asynchronous notification in order to alert other device drivers.

Upon learning that the owner of Device A is no longer present, the corresponding device driver on PC2 (presumably a previously registered contender for ownership) may attempt to establish ownership of Device A. If the device driver on PC2 was assigned a priority of 1 (i.e., it is next in line for ownership of the device) when registering for notification, it must attempt access as soon as the protocol allows after bus resets. After attempting to establish ownership of Device A, the device driver on PC2 issues an access data structure to its bus driver with the appropriate flags set to reflect that type of access thus established. If, however, the device driver on PC2 was not assigned the highest priority, it must wait for the duration of a reconnect timeout interval if specified by the device protocol.

Alternatively, in a preferred embodiment, it must wait a period of time equal to its assigned priority number (progressively higher priority numbers signifying progressively lower priorities) multiplied by a predetermined interval. For example, for a device driver assigned a priority of 3 and a predetermined interval of 250 ms, it must wait for 3*250 ms. This allows nodes with higher priority to attempt ownership first. If no broadcast packets are sent within this period of time, the device driver can attempt access as specified above. Again assuming that some level of access has been established, the device driver on PC2 issues the access data structure to its bus driver with the appropriate flags set to reflect that type of access thus established.

Responsive to the access data structure sent by the device driver, the bus driver on PC2 will issue a notification data structure back to the device driver reflecting the appropriate notification type. Additionally, the bus driver issues an access notification transaction packet to the other bus drivers on the communication bus reflecting the current access now granted to the device driver on PC2. The access notification transaction packet allows other control-capable nodes to re-register for notifications with the new owner (PC2).

Note that where PC1 is a legacy system, operation proceeds in the same manner described in Section A above.

C. PC1, PC2 and Device A in Operation; PC1 Abdicates Ownership

This scenario addresses the situation in which the current owner node (PC1) of Device A relinquishes ownership, either through user intervention or otherwise. For the purposes of this example, it is assumed that a user of PC1 has signaled to its device driver corresponding to Device A that it wants to disable Device A using, e.g., a PnP applet or similar mechanism. Responsive to such an indication, the device driver releases Device A using means specific to Device A's protocols. Furthermore, the device driver causes an access data structure to be sent to PC1's bus driver in which no ownership/access flags are asserted, thereby indicating no ownership. The bus driver replies to the bus driver with a notification data structure reflecting no ownership by the device driver. Also, the bus driver sends an access notification transaction packet to all other control-capable nodes on the communication bus, which transaction packet indicates that PC1 no longer retains ownership rights.

In response to the access notification transaction packet sent by PC1's bus driver, the bus driver on PC2 sends a notification data structure indicating that a change has occurred to the ownership status of Device A to the appropriate device driver on PC2. In response, the device driver on PC2 will attempt to establish ownership of Device A in essentially the same manner as described in Section B above, particularly with regard to assigned priorities.

With regard to legacy systems, a legacy PC cannot communicate ownership abdication. Only physical removal of PC1 will cause other control-capable nodes to attempt ownership.

D. PC1, PC2 and Device A in Operation; PC2 Initiates Ownership Transfer

In this scenario, PC2 actively attempts to transfer ownership of Device A from PC1 to itself. To this end, a user of PC2 signals to its device driver corresponding to Device A the user's desire to request transfer of Device A. In one embodiment, this is achieved using known PnP methods that cause the device to be "removed" in accordance with PnP procedures. In response, the device driver causes an access data structure to be sent to the bus driver in which the ownership/access flags indicate a desire for local ownership (i.e., in which the DESIRED_ACCESS and OWNERSHIP_LOCAL flags are asserted). In response to this access data structure, the bus driver issues an access transfer request transaction packet to the current owner.

Upon receiving the access transfer request transaction packet from PC2's bus driver, the bus driver on PC1 (owner node) issues a notification data structure to the device driver on PC1 thereby notifying the device driver of the request. In turn, the device driver notifies higher level applications of the request. In one embodiment, the device driver also initiates a timer to track the response of higher level application. The higher level application facilitates communication with a user of PC1, e.g., by causing a dialog box to be displayed, indicating that a remote control-capable node (and optionally providing an identification of the remote control-capable node) is requesting ownership of Device A.

If a user is present, then the user can decide to allow the ownership transfer. This is essentially an abdication of ownership at this point, and the process will proceed as described in Section C above. It should be noted that if the ownership transfer is allowed, but that the assigned priority of the requesting node is other than 1, then the bus driver on PC1 must send an access transfer response transaction packet denying access. PC1 must then abdicate ownership, as described above, thus allowing higher priority nodes to get access to Device A. If no higher priority node responds, then the original requesting node (PC2) can attempt access. Alternatively, if the user decided to deny the ownership transfer, then the bus driver on PC1 must send an access transfer response transaction packet denying access. If a user is not present or is otherwise not responding, expiration of the timer can be used to trigger a denial of the transfer request. Alternatively, an access data structure abdicating ownership can be issued upon expiration of the timer.

Note that if the owner node is a legacy system, the transfer request will be denied internally by the requesting bus driver on the requesting node.

The present invention provides novel techniques for ownership arbitration, particularly with regard to IEEE 1394-compliant systems. Using a distributed mechanism, the present invention does not require changes to existing devices. Furthermore, little or no user intervention is required; device drivers automatically detect changes to a device's ownership and notify registered prospective owners accordingly. What has been described is merely illustrative of the application of the principles of the present invention. Other arrangements and methods can be implemented by those skilled in the art without departing from the spirit and scope of the present invention. No claim should be interpreted to be in means plus function format.

What is claimed is:

1. A computer-readable medium having stored thereon a data structure for use in communicating between a first bus driver of a first control-capable node and a second bus driver of a second control-capable node, wherein the first control-capable node, the second control-capable node and a device are coupled to a communication bus, the data structure comprising:

at least one notification registration indicator representative of notification status of one of the first and second control-capable nodes, wherein changes to ownership status of the device are provided to the one of the first and second control-capable nodes based on the at least one notification registration indicator.

2. The computer-readable medium of claim 1, the data structure further comprising:
    a data structure status indicator representative of whether the data structure is an interrogative data structure or an informative data structure.

3. The computer-readable medium of claim 2, wherein the at least one notification registration indicator is representative of a desired access and a desired notification when the data structure is an interrogative data structure.

4. The computer-readable medium of claim 2, wherein the at least one notification registration indicator is representative of a notification registration status and an assigned priority when the data structure is an informative data structure.

5. The computer-readable medium of claim 1, the data structure further comprising:
    a target node identification field comprising an identification of the one of the first and second control-capable nodes; and
    a source node identification field comprising an identification of an other of the first and second control-capable nodes.

6. A computer-readable medium having stored thereon a data structure for use in communicating between a first bus driver of a first control-capable node and a second bus driver of a second control-capable node, wherein the first control-capable node, the second control-capable node and a device are coupled to a communication bus, the data structure comprising:
    at least one access transfer indicator representative of transfer status of one of the first and second control-capable nodes,
    wherein ownership of the device is transferred to the one of the first and second control-capable nodes based on the at least one access transfer indicator.

7. The computer-readable medium of claim 6, the data structure further comprising:
    a data structure status indicator representative of whether the data structure is an interrogative data structure or an informative data structure.

8. The computer-readable medium of claim 7, wherein the at least one access transfer indicator is representative of a desired access, a desired notification and an assigned priority when the data structure is an interrogative data structure.

9. The computer-readable medium of claim 7, wherein the at least one access transfer indicator is representative of an access transfer status when the data structure is an informative data structure.

10. The computer-readable medium of claim 6, the data structure further comprising:
    a target node identification field comprising an identification of the one of the first and second control-capable nodes; and
    a source node identification field comprising an identification of an other of the first and second control-capable nodes.

11. A computer-readable medium having stored thereon a data structure for use in communicating between a first bus driver of a first control-capable node and a second bus driver of a second control-capable node, wherein the first control-capable node, the second control-capable node and a device are coupled to a communication bus, the data structure comprising:
    at least one access notification indicator representative of access status of the device,
    wherein an owner node of the first and second control-capable nodes provides the at least one access notification indicator to an other of the first and second control-capable nodes.

12. The computer-readable medium of claim 11, the data structure further comprising:
    a target node identification field comprising an identification of the other of the first and second control-capable nodes; and
    a source node identification field comprising an identification of the owner node.

13. A computer-readable medium having stored thereon a data structure for use in communicating between a first bus driver of a first control-capable node and a second bus driver of a second control-capable node, wherein the first bus driver communicates with a first device driver resident on the first control-capable node and the second bus driver communicates with a second device driver resident on the second control-capable node, and wherein the first control-capable node, the second control-capable node and a device are coupled to a communication bus, the data structure comprising:
    at least one direct communication indicator that instructs one of the first and second bus drivers that the data structure comprises information to be delivered directly to a corresponding one of the first and second device drivers.

14. The computer-readable medium of claim 13, the data structure further comprising:
    a target node identification field comprising an identification of one of the first and second control-capable nodes; and
    a source node identification field comprising an identification of an other of the first and second control-capable nodes.

15. A computer-readable medium having stored thereon a data structure for use in communicating from a device driver to a bus driver in a local control-capable node, the data structure comprising:
    at least one ownership indicator representative of an ownership status of a device relative to a plurality of control-capable nodes including the local control-capable node, wherein the device and the plurality of control-capable nodes are coupled to a communication bus; and
    at least one access indicator representative of an access status of the device relative to the plurality of control-capable nodes.

16. The computer-readable medium of claim 15, the data structure further comprising:
    a data structure status indicator representative of whether the data structure is an interrogative data structure or an informative data structure.

17. The computer-readable medium of claim 15, wherein the at least one ownership indicator is representative of either ownership by the local control-capable node or ownership by a remote control-capable node of the plurality of control-capable nodes.

18. The computer-readable medium of claim 17, further comprising:
    a remote owner identification field comprising an identification of the remote control-capable node.

19. The computer-readable medium of claim 15, wherein the at least one access indicator is representative of either shared access between the plurality of control-capable nodes or exclusive access for one of the plurality of control-capable nodes.

20. The computer-readable medium of claim 15, wherein the at least one access indicator is representative of shared read access, shared write access or both between the plurality of control-capable nodes.

21. The computer-readable medium of claim 15, further comprising:
at least one notification indicator representative of a notification status of the local control-capable node.

22. The computer-readable medium of claim 15, wherein the at least one notification indicator is representative of either of notification upon the occurrence of a communication bus event or notification upon change to the ownership status of the device.

23. In a system comprising a plurality of control-capable nodes and at least one device in communication with each other via a communication bus, a method for arbitrating usage of the at least one device, the method comprising:
determining, by a first control-capable node of the plurality of control-capable nodes ownership of the device by a second control-capable node of the plurality of control-capable nodes; and
sending, by the first control-capable node to the second control-capable node, a first message requesting ownership of the device by the first control-capable node.

24. The method of claim 23, wherein the communication bus is a 1394-compliant serial bus, the step of determining ownership by the second control-capable node further comprising a step of enumerating the second control-capable node by the first control-capable node.

25. The method of claim 23, wherein the step of determining ownership by the second control-capable node further comprises the step of determining non-exclusive ownership by the second control-capable node, and wherein the first message requests non-exclusive ownership by the first control-capable node.

26. The method of claim 23, further comprising a step of:
registering, by the first control-capable node with the second control-capable node, for notification upon changes to ownership status of the device.

27. The method of claim 23, wherein the first message requests exclusive ownership of the device by the first control-capable node.

28. The method of claim 27, further comprising a step of:
receiving, by the first control-capable node from the second control-capable node, a second message denying the request for exclusive ownership in the first message.

29. The method of claim 27, further comprising a step of:
receiving, by the first control-capable node from the second control-capable node, a second message granting the request for exclusive ownership in the first message.

30. In a system comprising a plurality of control-capable nodes and at least one device in communication with each other via a communication bus, a method for arbitrating usage of a device of the at least one device, the method comprising:
determining, by a first control-capable node of the plurality of control-capable nodes, that ownership of the device by a second control-capable node of the plurality of control-capable nodes has terminated; and
establishing, by the first control-capable node, ownership of the device by the first control-capable node responsive to the termination of ownership by the second control-capable node.

31. The method of claim 30, the step of determining the ownership of the device by the second control-capable node has terminated further comprising a step of:
determining that the second control-capable node is no longer coupled to the communication bus.

32. The method of claim 30, the step of determining that ownership of the device by the second control-capable node has terminated further comprising a step of:
receiving a first message from the second control-capable node indicating that ownership of the device by the second control-capable node has terminated.

33. The method of claim 30, the step of establishing ownership by the first control-capable node further comprising a step of:
establishing ownership by the first control-capable node in accordance with an assigned priority.

* * * * *